C. B. BOYLE.
CORNEA LENS.
No. 52,672. Patented Feb. 20, 1866.
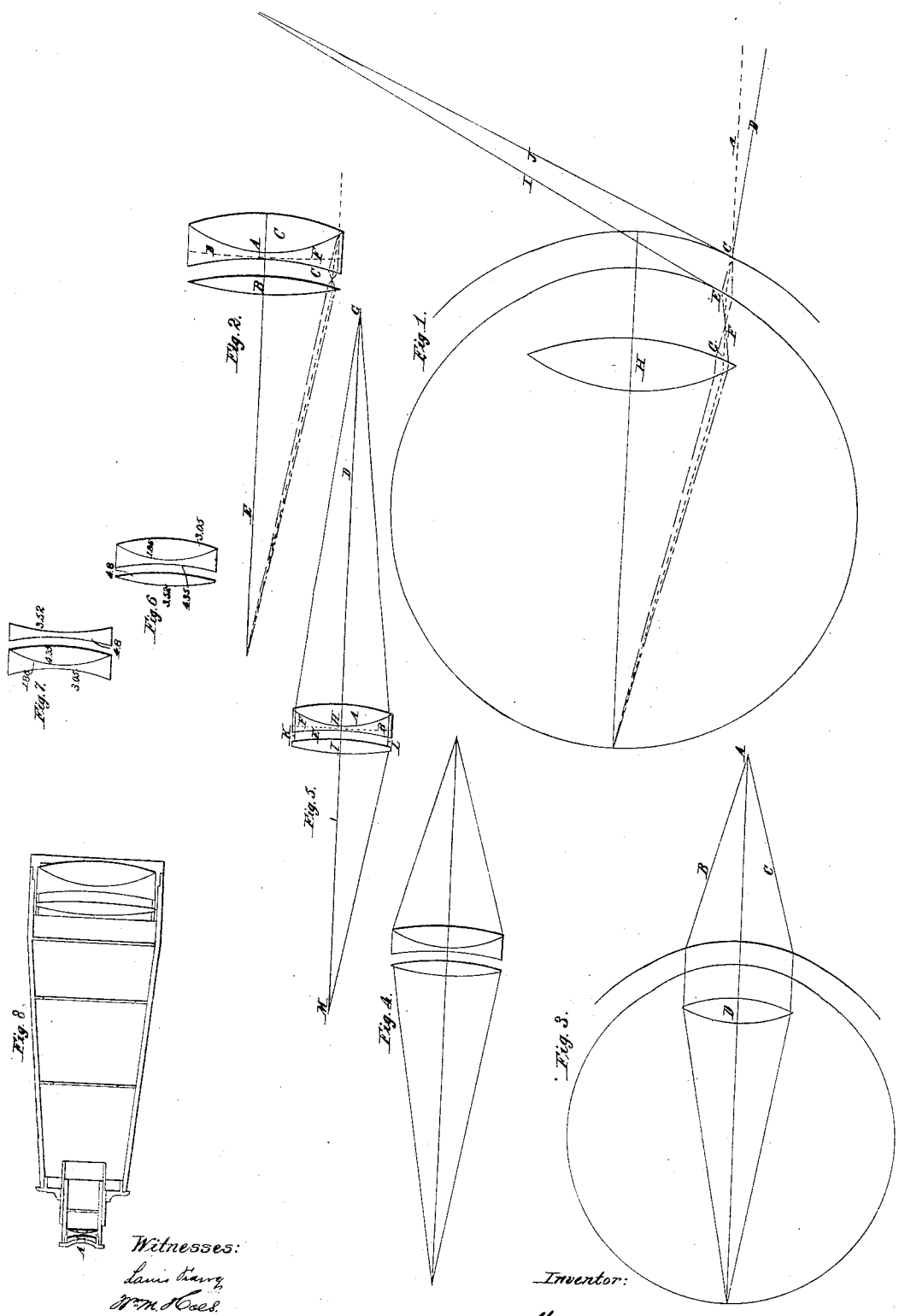
Witnesses:
Inventor:

UNITED STATES PATENT OFFICE.

CHARLES B. BOYLE, OF NEW YORK, N. Y.

IMPROVEMENT IN LENSES.

Specification forming part of Letters Patent No. 52,672, dated February 20, 1866; antedated February 16, 1866.

*To all whom it may concern:*

Be it known that I, CHARLES B. BOYLE, of the city, county, and State of New York, have invented a new and Improved Mode of Combining Lenses for Optical Purposes; and I do hereby declare that the following is a full and exact description thereof, reference being had to the accompanying drawings and the letters of reference marked thereon.

The nature of my invention consists in applying to the structure of lenses the philosophy of the human eye, transposing not the mechanical formula observed in the elements of that structure, but the mechanical results to glass and air.

For the better understanding of this transposition it will be necessary to enter somewhat in detail into a comparison of the mechanism of the cornea-lens herewith submitted with that of the eye, and the consequent theory in which both alike are involved; and though the position here assumed differs radically from all philosophies of the human eye hitherto advanced, it needs no further proof of its truth than the fact that the resulting action of the cornea-lens is identical in all respects with that of the eye, alike free from spherical and chromatic aberration. Like the eye, it is sharp only in the axis of the lens. Like the eye, but unlike all other optical combinations of lenses, the definition is not improved by diaphragming, save when the light is too powerful.

Figure 1 represents an enlarged section of the cornea, aqueous humor, crystalline lens, and vitreous humor, cut through the axis of refraction, and is drawn for the purpose of illustrating the refraction and dispersion of a beam of light in passing through those organs to a focus.

The parallel pencil of light A, impinging on the outer or convex surface of the cornea at the point C, Fig. 1, suffers refraction in the direction of the line D, passing out of the inner surface of the cornea at E, where it again suffers refraction in the direction of the line F, which is nearly parallel to the axis of the lens, diverging a little outward; but the amount of divergence is only the quality of spherical aberration due to the angles at which the light encountered the spherical surfaces through which it has passed. Consequently the whole volume of light which has traversed the cornea is neutral in refraction plus spherical aberration. But the color suffers prismatic dispersion because, from the examination of the angles, it will be found that though the inner and outer surfaces of the cornea are parallel to each other when measured along their common radius, yet the points C and E of the surfaces of the cornea, where the parallel pencil of light A entered and departed, are not parallel to each other, but inclined at an angle the convergence of which is toward the center, as shown by their projected tangents I and J. Consequently the cornea, owing to the very nature of refraction, has the properties of a dispersive or negative lens, and the result is that the color is dispersed from the inner surface of the cornea, as shown by the colored lines at the point E; and the reason why this peculiarity of angles and refraction has no positive dispersive refraction is that the light impinges on the outer surface of the cornea from air, yet does not depart from the cornea into air again, but passes direct from the cornea into the aqueous humor, which is denser than air, and therefore prevents the ray from being refracted outward, as it would be if the order were air, cornea, air, instead of air, cornea, aqueous humor; but the chromatic dispersive power of the cornea being greater than that of the aqueous humor as compared with their relative powers of refraction, the dispersion of color produced by the cornea continues through the aqueous humor with inverse chromatic dispersion to that of a condensing-lens, delivering the light in that condition to the crystalline lens H, as shown at G, Fig. 1. Therefore we have the light impinging upon the first surface of the crystalline or object lens H, not as white light, as is the case with all artificial object-glasses now in use, but as a prismatic group of colored rays, the chromatic dispersion of which is in the inverse order of the dispersive power of the crystalline lens. Consequently the action of the chromatic dispersion of the crystalline lens will bring back this inverse order of colored light impinging upon its surface to white light, carrying the whole to a focus free from color.

After taking into consideration the power of the dispersive refraction of the cornea and aqueous humor upon light impinging upon the cornea from air, we will find from careful projection and computation that the refraction is neutral; but the element of spherical aberration, which is derived entirely from the spherical forms of the surfaces through which the light has passed, is fully developed, and those spheres and angles, as shown by the pencil of light A and the tangents I and J of the points of contact C and E on the surfaces of the cornea having the properties of a dispersive lens, the spherical aberration developed is therefore in the opposite direction from that developed by the spherical surfaces of a lens with a positive focus, and therefore, the light impinging on the crystalline lens being plus, dispersive spherical aberration is carried to a focus minus spherical aberration, because it took all the quantity of spherical aberration due to the crystalline lens to invert the reversed order of spherical aberration already developed upon its surface by the cornea; hence the eye is free from spherical aberration; hence the cornea-lens is free from spherical aberration.

Having thus outlined the course of reasoning that suggested the cornea-lens, I will now proceed to describe the structure required to accomplish like results to those above attributed to the human eye, for the cornea-lens is not a copy of the mechanical forms of the eye, as it is evident that, when the elements are changed from the various and delicate materials of the eye to that of mere glass, to obtain the same results it will be necessary to change the forms in keeping with the changed condition of the elements used.

A, Fig. 2, represents a combination of flint and crown glass through which the light passes without suffering final refraction—that is to say, that, though suffering refraction at each surface of the glass, ultimately it has no focus and no dispersive refraction, for, though possessing the elements of dispersive spherical aberration, the actual lines of aberration, if produced backward, would present only an exhibition of spherical aberration unaccompanied by refraction, and would bisect each other in the form of a curve, which, though always approaching the axis of the lens, would never touch it. This instrument therefore is minus in refraction plus inverse spherical aberration, for spherical surfaces cannot be employed even to produce combinations which will be neutral in refraction, but the instrument will always be accompanied by the full amount of inverse spherical aberration due to the spherical surfaces through which the light has passed, because refraction and spherical aberration being the result of different causes, it follows that either may exist without the presence of the other—as, for instance, parabolic surfaces of the proper curvature will refract light to a focus without spherical aberration. In the instrument here presented, A, Fig. 2, spherical aberration and chromatic dispersion exist without the presence of refraction, and when the accompanying lens B, Fig. 2, is in proper position behind this cornea refraction to a single focus exists without spherical or chromatic aberration.

The front lens, C, of the glass cornea, Fig. 2, is crown-glass. The negative lens F is of flint. If the flint-glass lens F were ground to the dotted line D, the portion between that line and the crown-glass lens C would form with the crown-glass lens C an achromatic combination-lens the focus of which would be at E: but now enough flint-glass is required in addition to that achromatic combination to neutralize the refraction, and after making the necessary calculation we find that by grinding the back curve of the flint-glass lens F to the line G we secure this condition, but it will now be clear that, while this finished combination has no refraction, it will have a plus of chromatic dispersion due to all that quantity of flint-glass contained between the dotted line D and the concave surface G. Then there will be the same order of chromatic dispersion as occurs in the cornea and aqueous humor at Fig. 1. Consequently we have an instrument of glass which performs exactly the same functions as those ascribed above to the cornea and aqueous humor of the natural eye—that is, it is neutral in refraction plus spherical aberration plus dispersion of color—and as that dispersion of color is due altogether to that portion of the flint-glass lens F lying between the dotted line D and the concave surface G, it is therefore evident that the dispersion is in the opposite direction from that produced by a lens having a positive focus. Then the lens B, the curves of which are so computed that they will correct the plus of color existing in the cornea A, is interposed at the proper distance behind the cornea, and in this position receives the light from that instrument, not as white light, but as a group of prismatic rays minus in refraction plus inverse spherical aberration plus inverse chromatic dispersion. It therefore refracts this light to a focus free from aberration, chromatic or spherical.

And it may be well to add here that, so far as my experience has gone, I have found that the accompanying back lens of the artificial cornea requires to be made upon the same relative lines as the crystalline lens of the eye, and placed, as it is, with the flat or least convex side toward the cornea.

The radii of the crystalline lens of the eye are to each other as 15 is to 11, and the associate lens of the artificial cornea will be best when its radii bear to each other the same proportions, and to the extent to which this condition is transgressed the instrument will be defective.

To make the most successful telescope it is necessary that the cornea be neutral in refraction. This quality of the cornea can easily be tested, for when it is put in combination with its lens and the focal distance of the lens suffers the least change the cornea will be found to have either positive or negative refraction. If the focal distance of the lens be shortened by the action of the cornea, it follows that the cornea possesses positive or collective refraction, and if the focal distance of the lens be lengthened by the action of the cornea it will be evident that the cornea must then possess negative or dispersive refraction, and it will be found that to the extent the focal distance of the lens is disturbed by the cornea the image in the focus will be defective, and those defects will be found to correspond exactly with the defects of the human eye arising from like causes, and can be remedied by exactly the same means, for if the focal distance of the lens be extended, it follows that the cornea is dispersive in refraction. Therefore, if we place in front of it a lens possessing the same amount of positive refraction as the cornea possesses of negative refraction, we will make the cornea, together with this new lens in front of it, neutral, and the focal distance of the lens will then be undisturbed, and we will have an example of the common phenomenon of the use of spectacles. On the other hand, if the cornea is positive and shortens the focal distance of the lens, it may be remedied by placing in front of it a lens as negative in refraction as the cornea is positive, restoring thereby an undisturbed action to the crystalline lens parallel to the same phenomenon and the same cure in the human eye; but as all such conditions are only for the purpose of remedying defects in the human eye, it is understood here that I do not propose to remedy defective corneas in this or any other way, but to point out the necessity of making them right in the first place.

The amount of separation between the cornea and lens will best be found by testing after the instrument is made, as more or less separation seems to have the power of correcting inaccuracies of color and refraction, which may arise from the handling during the process of manufacturing the lenses, and the accidental qualities of glass which cannot otherwise be provided against.

The preceding portion of this specification has reference only to such instruments as are used at a sufficiently great distance from their objective points as to have the light proceeding from such objects equivalent to parallel light, such as a telescope, photographic-view lens, &c.; but in an instrument which, from the nature of its use, requires to approach nearer to its object, such as a portrait combination-lens, an eye-piece, or a microscope, it will be necessary to introduce such modifications of the cornea-lens as will identify its optical qualities with those of a short-sighted human eye, many of which see objects distinctly at distances so short that the perfect eye, which is telescopic in its action, could see but very imperfectly.

Now the cause of a short-sighted human eye lies in the fact that the cornea and aqueous humor have positive refraction, which of course disturbs by shortening the focus of the crystalline lens; but as the object approaches the eye the focus lengthens, until finally it comes into such relations to the eye that the light from the object, after traversing the cornea and aqueous humor, falls upon the crystalline lens as parallel light, and is then refracted by that member to its natural focus, thus restoring an arbitrary condition of perfect vision, and what is said to be an imperfect eye sees under those circumstances an object at a short distance with far greater accuracy than the most perfect eye at the same distance; and to meet this necessity in optical instruments we need only follow the suggestions of nature, and the instrument that is required to act upon objects close to it must be modeled upon its natural prototype.

Fig. 3 is a section of a short-sighted human eye, A the object under examination. Lines of light proceeding from the object are represented by B and C. The cornea and aqueous humor, having positive refraction, bend those rays back parallel with the axis, causing them to impinge on the front surface of the crystalline lens D as parallel light, which therefore refracts them to its natural focus free from disturbance, as it would do if the cornea and aqueous humor were absolutely neutral in refraction, and the object A removed to a sufficient distance to constitute the light proceeding from it to the cornea parallel; but the vision produced by the cornea and aqueous humor, which are neutral in refraction, while it would perceive distinctly the distant object, would fail entirely upon the near one, and the short-sighted eye, owing to the positive quality of the cornea and aqueous humor, would have this order of vision reversed, and perceive with distinctness the near object, but the distant one dimly and very imperfect.

Fig. 4 is a combination of glass the optical results of which are the same as those of a short-sighted human eye, and in which is involved the general theory of the construction and modification of the cornea combination in its application to optical instruments, which, from the nature of their use, require to approach their objects so closely that the light proceeding from the object is so perceptibly divergent that it distinctly changes the focal distance. But to apply it to one of the purposes for which it may be used, let us suppose that it is required to construct a photographic lens for making a large portrait from life, and, after taking into consideration the distance from the instrument to the sitter, we make the crown-glass lens A, Fig. 5, and to achromatize that lens we require the amount of flint-glass contained between the dotted line B and the line C, and this combination would have its focus at D; but as it is not an achromatic lens which is required, but such a combination as will resemble in its optical action the cornea and aqueous humor of a short-sighted eye, we do not grind the flint-glass lens F to the dotted line B, but to the line E, the radius of which is determined by the amount of positive refraction required in the cornea, which, in turn, is determined by the distance which the instrument is required to be placed from the object when in use; and now by this addition of glass we find that the focus has been extended until it falls upon the point G, which is the distance occupied by the sitter or the object. But now, in referring back to the cornea H, Fig. 5, we find that it has a plus of color due to all that portion of flint-glass lying between the dotted line B and the concave surface E, which its associate lens I must be made to correct. But it is not to be understood that the lens made in this way should always when in use sustain that particular fixed distance from the sitter, as it will work well at greater or less distances than the point for which it has been especially calculated, though always best when in that position.

Upon the examination of Fig. 5 it will be seen that the cornea H, owing to its power of positive refraction, takes up the rays diverging from the object G and turns them back parallel to the axis, as represented by the lines K and L, and all the rays received by the cornea from the object G when at the computed distance impinge upon the lens I, not as diverging but as parallel light plus color plus inverse spherical aberration, and are therefore carried to the natural focus M of the lens I free from chromatic or spherical aberration.

It will now be seen from the foregoing specification and drawings that what is claimed as original in the cornea-lens, aside from its excellence, is its optical identity with that herein assumed to be the true theory of the laws of vision pertaining to the human eye, whether that organ be telescopic or microscopic in its refractions.

A negative eye-piece for any object-glass made upon this principle is only the lines and glass of any good cornea object-glass in inverse order, as represented at Figs. 6 and 7, where the radii of the curves are marked on each to show their correspondence; but the negative eye-piece proper, of which Fig. 7 is an enlarged view, may be reduced to any desired size by retaining the proportions of a good object-glass in inverse order, as represented at A, Fig. 8, which figure is a longitudinal central section of the accompanying model.

Positive cornea eye-pieces are simply the ordinary positive structure above described modified to suit existing circumstances.

What I claim as my invention, and desire to secure by Letters Patent, is—

The use of a glass cornea in front of the objective lens of a microscope or telescope.

CHARLES B. BOYLE.

Witnesses:
 WM. M. HAES,
 LOUIS PRANG.